US006827453B2

(12) United States Patent
D'Alessio et al.

(10) Patent No.: US 6,827,453 B2
(45) Date of Patent: Dec. 7, 2004

(54) METHOD AND SYSTEM FOR CONTROL OF DISPLAY LAMP ILLUMINATION WITH LENS CAP POSITION

(75) Inventors: Samuel Nicklaus D'Alessio, Round Rock, TX (US); Wilson Bradley, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/405,437

(22) Filed: Apr. 2, 2003

(65) Prior Publication Data

US 2004/0196442 A1 Oct. 7, 2004

(51) Int. Cl.[7] .............................................. G03B 21/20
(52) U.S. Cl. ........................................................ 353/85
(58) Field of Search ............................ 353/85, 97, 119; 348/372, 373, 818, 842; 396/448

(56) References Cited

U.S. PATENT DOCUMENTS

| | | | | |
|---|---|---|---|---|
| 3,578,839 A | * | 5/1971 | Riggle et al. ................ 359/507 |
| 4,037,254 A | * | 7/1977 | Monahan ................. 348/221.1 |
| 5,287,132 A | | 2/1994 | Suzuki et al. ................ 353/119 |
| 5,347,324 A | | 9/1994 | Sasaki et al. ................ 348/789 |
| 5,396,301 A | * | 3/1995 | Sasaki et al. ................ 348/794 |
| 5,920,342 A | * | 7/1999 | Umeda et al. ........... 348/211.14 |
| 6,111,609 A | * | 8/2000 | Stevens ........................ 348/372 |
| 6,570,621 B2 | * | 5/2003 | Bigler et al. ................. 348/372 |
| 6,636,274 B1 | * | 10/2003 | Mazda et al. ................ 348/745 |

FOREIGN PATENT DOCUMENTS

JP  2000-112029  * 4/2000  ........... G03B/21/14

* cited by examiner

*Primary Examiner*—Christopher Mahoney
(74) *Attorney, Agent, or Firm*—Hamilton & Terrile, LLP; Robert W. Holland

(57) ABSTRACT

A lens cap position sensor detects covering of a projector display lamp lens by a lens cap and reduces or disables illumination from the display lamp to prevent melting of the lens cap. For instance, electrical contacts associated with the lens cap complete a circuit when in contact with a conductive portion of the housing of the projector due to insertion of the lens cap over the lens, the completed circuit signaling an illumination controller of the projector to turn off the lamp or illuminate dark colors. Alternatively, a light sensor, such as an infrared sensor located on the inner surface of the lens cap, detects illumination from the lamp to sense insertion of the lens cap over the lens and to signal the illumination controller to turn off the lamp. In one embodiment, lens cap position signals are sent from the lens cap to the illumination controller through wires that secure the lens cap to the projector.

21 Claims, 4 Drawing Sheets

METHOD AND SYSTEM FOR CONTROL OF DISPLAY LAMP ILLUMINATION WITH LENS CAP POSITION

BACKGROUND OF THE INVENTION

1. Field of the Invention

The present invention relates in general to the field of displaying information, and more particularly to a method and system for control of display lamp illumination with lens cap position.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One increasingly common way of displaying information is to communicate the information to a portable projector and project an image on a large screen using a bright display lamp. Portable projectors increase the convenience of display of computer generated information, such as presentations generated by Power Point or other applications running on portable information handling systems, by allowing the direct display of information from an information handling system instead of outputting display slide shows or overhead slides. Projector displays have steadily improved in quality with higher lumen output lamps for increased brightness and clarity of displayed information. Further, portable projectors have decreased in size and cost so that traveling business people are more easily able to carry and use projectors for presenting information on screens viewable by large audiences.

One difficulty with portable projectors is that the high lumen bright lamps typically used by portable projectors output considerable heat and, as the brightness output by projectors increases, so does the heat. In normal operations, the lamp is cooled, such as with a cooling airflow, to remove excess heat. However, projector users, who are often under intense pressure when performing presentations, sometimes incorrectly use the projector by inserting the lens cap over the projector lens to block light instead of simply turning off the lamp. Under the intense light of a high lumen lamp, lens caps will melt in a relatively short time period, perhaps leading to destruction of the projector or injury to the user and even creating a fire hazard. One solution is to use a clear or translucent lens cap that does not absorb heat as quickly. However, such lens caps will generally melt eventually and users seeking to block light during a presentation may instead place a different device over the lens to block light, even a flammable device, thus creating an increased danger. Another solution is to use a non-melting material, such as metal or high temperature plastic resins. However, metal lens caps become excessively hot resulting in a risk of burn injury to the user and high temperature resins are difficult to make and mold into parts. Another solution is to display less bright colors at the lens cap when an idle screen is displayed, however, the displayed information generally depends upon the selection of the user who may be attempting to block a bright display temporarily during a presentation.

SUMMARY OF THE INVENTION

Therefore a need has arisen for a method and system which controls display lamp illumination of a portable projector based on lens cap position.

In accordance with the present invention, a method and system are provided which substantially reduce the disadvantages and problems associated with previous methods and systems for preventing melting of lens caps that are placed over a lens illuminating light from a lamp. An auto-sensing lens cap detects blocking of illumination by the presence of the lens cap proximate the lens and reduces illumination from the lamp to prevent damage to the lens cap.

More specifically, a lens cap position sensor detects when the lens cap is placed over a lens. For instance, electrical contacts integrated in the lens cap complete a circuit with a conductive portion of the lens housing to signal that the lens cap is inserted over the lens. Alternatively, a light sensor or heat sensor located on the inner surface of the lens cap detects light or heat generated by illumination from the lamp on the sensor when the lens cap is blocking the lamp. The lens cap position sensor signals that the lens cap is positioned proximate the lens through wires that secure the lens cap to the projector. The lens cap position sensor signal is provided to an illumination controller that reduces illumination of the lamp to prevent melting or otherwise overheating the lens cap. For instance, firmware of the projector turns off the lamp after a predetermined time in which the lens cap covers the lens. Alternatively, the processor of the projector reduces illumination by overriding the current display of information with a dark display. When the lens cap position sensor detects removal of the lens cap from blocking the lens, the illumination controller resumes display of information by illumination of the lamp.

The present invention provides a number of important technical advantages. One example of an important technical advantage is that a projector display lamp illumination is controlled based on lens cap position so that illumination is ended or limited when the lens cap is placed over the lens. Reducing or eliminating illumination from a lamp onto a lens cap reduces the risk of melting or burning the lens cap, and thus reduces the risk of injury to the user or damage to the projector. A timed delay from the covering of the lens with the lens cap to the eliminating of lamp illumination reduces interference with a user's presentation of information that involves limited blocking of projected light. A display of dark colors to limit heat output by the lamp onto the lens cap further reduces impact by allowing recovery of a lamp to full illumination in reduced time relative to the time generally required to initiate illumination from a lamp that is shut off.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A projector for presenting information provided by an information handling system selectively illuminates a lamp for display of the information based on the position of a lens cap to aid in preventing damage to the lens cap if the lens cap covers an active lamp. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
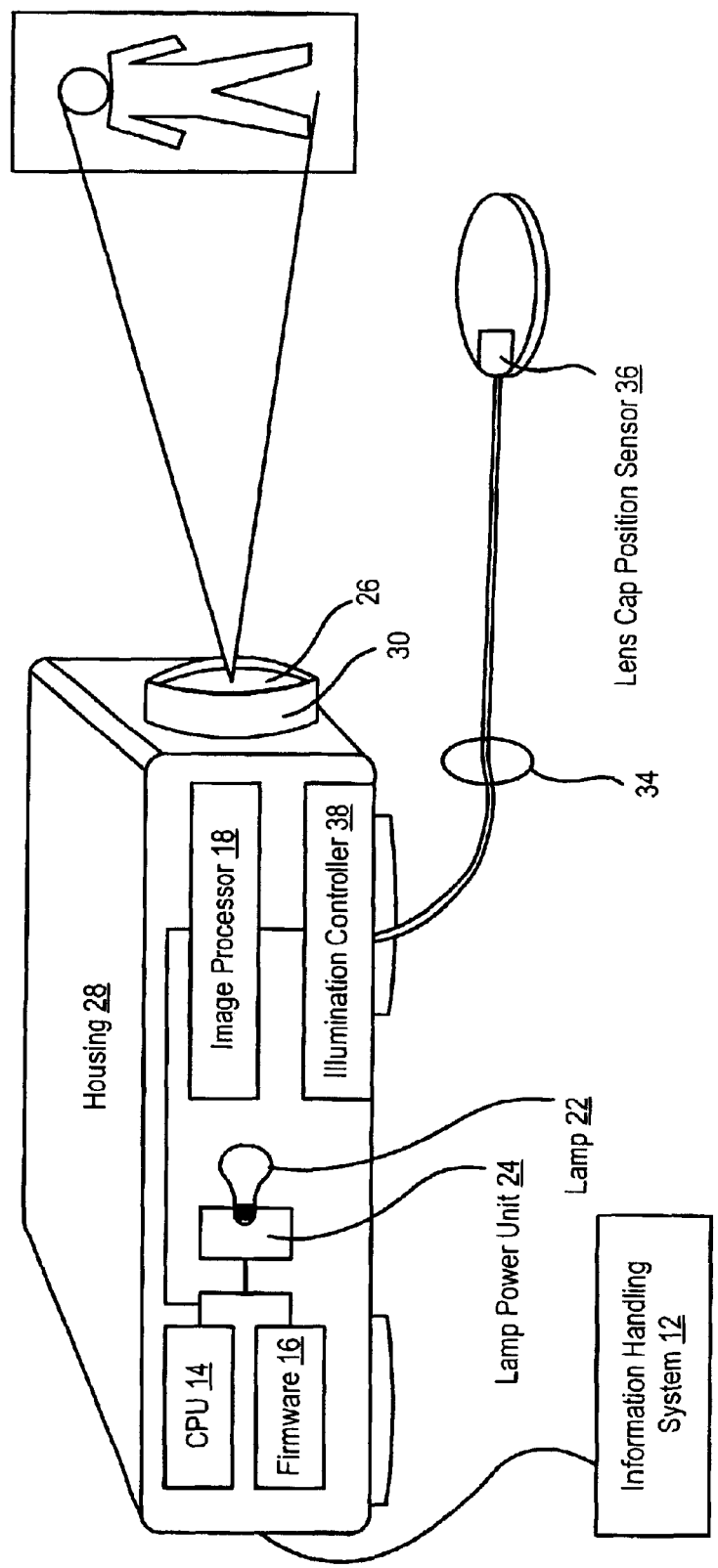
FIG. 1 depicts a block diagram of a projector configured to control lamp illumination based on lens cap position.
Figure 1A:
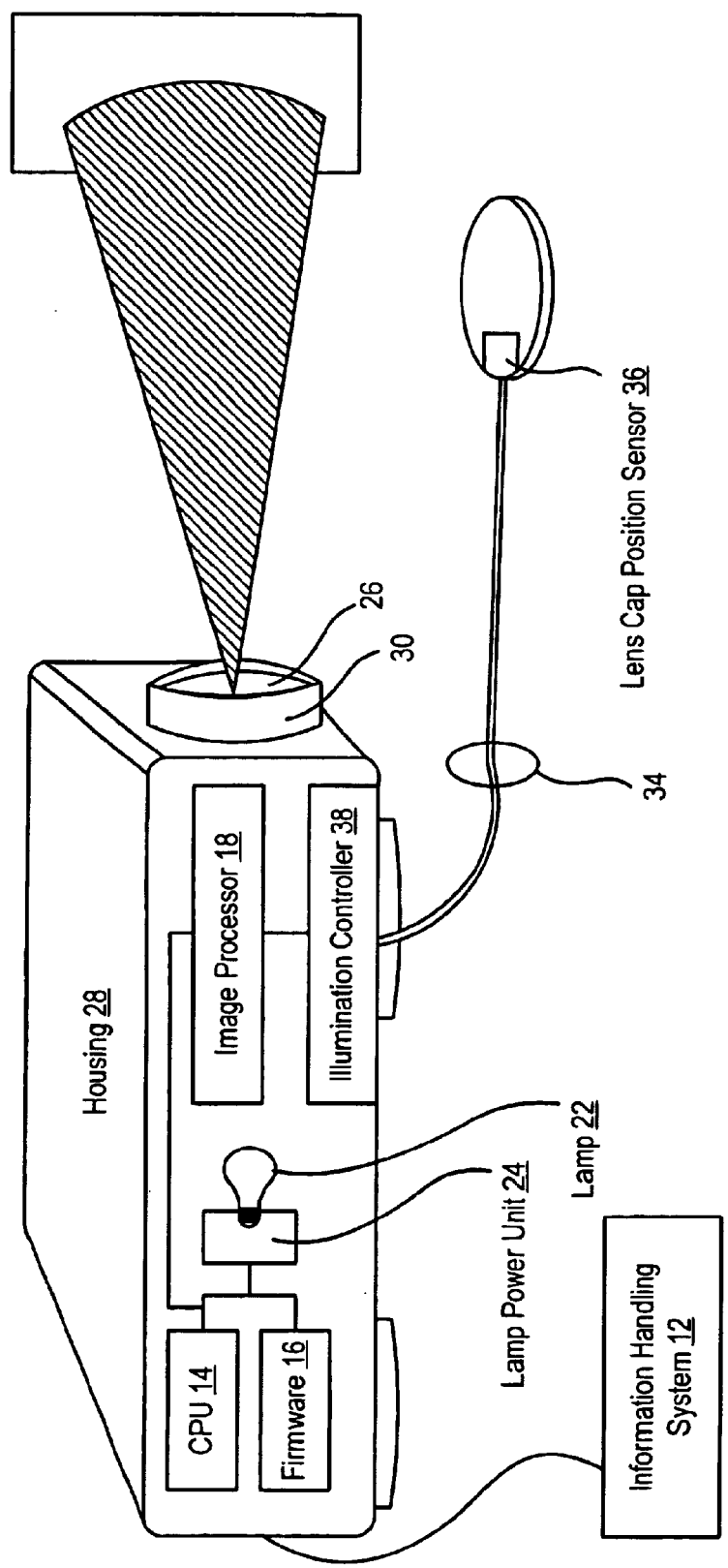

Referring now to FIG. 1, a block diagram depicts a projector 10 operable to display information, such as information provided from an information handling system 12 running a presentation application, such as Microsoft Power Point. Projector 10 processes display information with processing components, such as a CPU 14 and Firmware 16, and provides the display information to an image processor 18. Image processor 18 generates an image from the display information, such as an image presented on a LCD screen, and the image is projected to a screen 20 by light illuminating from a lamp 22. Lamp 22 is a high lumen light source powered by a lamp power unit 24 that generates generally high voltages. Illumination from lamp 22 passes through image processor 18 and is focused by a lens 26 secured to projector housing 28 by a lens housing 30. Lens housing 30 rotates to focus the image projected on screen 20.

A lens cap 32 is secured to projector 10 with a pair of electrical wires 34. Lens cap 32 secures to lens housing 30 to protect lens 26 from damage and also to block light from illuminating out lens 26 to screen 20. A lens cap position sensor 36 is integrated into lens cap 32 to detect the position of the lens cap relative to projector 10. In particular, lens cap position sensor 36 detects when lens cap 32 is proximate to or covers lens 26 to block illumination through lens 26 and when lens cap 32 is removed from lens 26 to allow illumination through lens 26. For instance, lens cap position sensor 36 completes an electrical circuit when in contact with lens cap housing 30. Alternatively, in another embodiment lens cap position sensor 36 is a heat sensor that detects excessive temperatures generated by direct illumination from lamp 22 at the inside surface of lens cap 32 when inserted over lens 26. In yet another embodiment, lens cap position sensor 36 is a light sensor that detects excessive illumination from lamp 22 at the inside surface of lens cap 32 when inserted over lens 26. For instance, lens cap position sensor 36 is a photo transistor tuned to a predetermined light spectrum, such as infrared light.

If lens cap position sensor 36 detects that lens cap 32 is in a position proximate to lens 26, lens cap position sensor sends a signal to an illumination controller 38. Illumination controller determines if lamp 22 is illuminating light with lens cap 32 secured over lens 26 and, after a predetermined time delay, reduces the illumination of lamp 22 to prevent damage to lens cap 32. For instance, illumination controller 38 is firmware that commands lamp power unit 24 to turn off lamp 22 within a predetermined time that is less than the time in which lens cap 32 will melt. Alternatively, illumination controller 38 commands image processor 18 or CPU 14 to illuminate a dark screen to limit the radiant energy provided to lens cap 32 so that it is less than the level of radiant energy needed to melt lens cap 32. Once lens cap position sensor 36 detects that lens cap 32 is removed from a position proximate lens 26, lens cap position sensor 36 sends a signal to illumination controller 38 to resume normal illumination with lamp 22. If lamp 22 is recovering from an off state, some delay is experienced bringing the lamp to full illumination whereas recovery from a dark image state introduces little if any delay since the lamp remains illuminated. In one embodiment, illumination controller 58 commands a dark image after a first time delay to allow quick recovery and commands the lamp off after a second delay.

Figure 2:
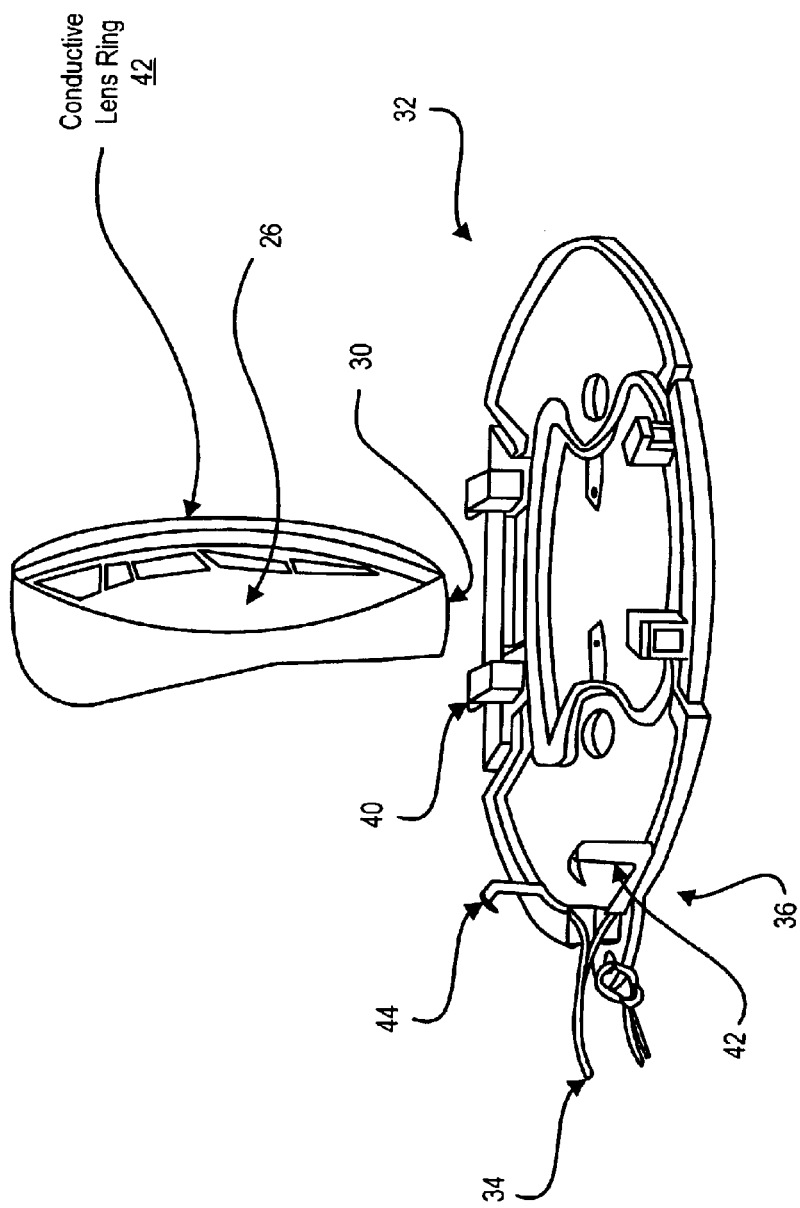
FIG. 2 depicts a blow up view of a lens cap configured with one embodiment of a lens cap position sensor.

Referring now to FIG. 2, a blow-up view of one embodiment of lens cap sensor 36 is depicted. A coupling mechanism 40 removably secures lens cap 32 to lens housing 30 by pressing against a conductive lens ring 42 integrated in lens housing 30. Securing lens cap 32 against lens housing 30 brings a positive contact 42 and a negative contact 44 into electrical communication with conductive lens ring 42. Positive contact 42 provides a current from illumination controller 38 through a wire 34 which completes a circuit with a ground provided by negative contact 44 from illumination controller 38 when both contacts are in electrical communication with conductive lens ring 42. Illumination controller 38 detects the completed circuit to determine that lens cap 32 is positioned to block light illuminating from lens 26. In an alternative embodiment, lens cap 32 provides a conductive ring for positive and negative contacts associated with lens housing 30. The completed circuit in such an embodiment is sensed through brush contacts communicating between lens housing 30 and projector 10 to allow movement of the lens for focusing of images.

Figure 3:
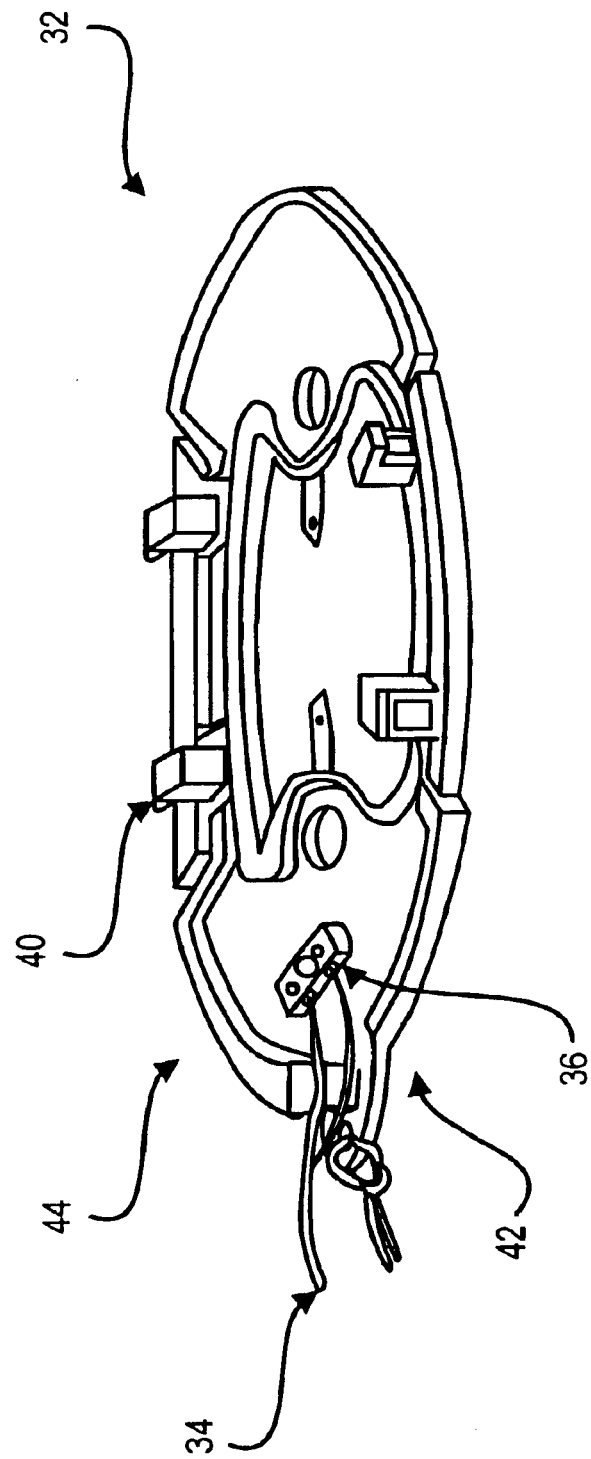
FIG. 3 depicts a blow up view of a lens cap configured with a light sensor embodiment of a lens cap position sensor.

Referring now to FIG. 3, a blow-up view of another embodiment of lens cap sensor 36 is depicted. Lens cap sensor 36 is a phototransistor that generates electricity when exposed to light energy. The phototransistor is targeted to detect a predetermined level of light energy, such as a level associated with risk of heat damage to lens cap 32. For instance, the phototransistor is targeted to generate electricity from infrared radiation and, once a predetermined level of electricity is detected, light energy is reduced, such as by projecting dark light or turning off lamp 22. The projector returns to normal operation with removal of lens cap 32 detected by a physical sensor. Alternatively, where light energy is reduced by transition to illumination of a dark image, removal of lens cap 32 and return to normal operations is accomplished when the electricity produced by the phototransistor falls below the expected level associated with illumination of a dark image on an installed lens cap.

Although the present invention has been described in detail, it should be understood that various changes, substitutions and alterations can be made hereto without departing from the spirit and scope of the invention as defined by the appended claims.

What is claimed is:

1. A system for controlling a projector lamp illumination of light through a lens based on a lens cap position relative to the lens, the system comprising:
   a lens housing holding the lens in position to illuminate light from the projector lamp;
   a lens cap coupler operable to hold the lens cap over the lens housing to block light illuminating from the lens;
   a lens cap position sensor coupled to the lens cap and operable to detect if the lens cap is position over the lens housing to block light illuminating from the lens; and
   an illumination controller interfaced with the lens cap position sensor through the lens housing, the illumination controller operable to reduce illumination from the lamp if the lens cap position sensor detects that the lens cap is positioned over the lens housing.

2. The system of claim 1 wherein the illumination controller reduces illumination from the lamp by turning off the lamp.

3. The system of claim 1 wherein the illumination controller reduces illumination from the lamp by illuminating a dark image.

4. The system of claim 1 wherein the lens cap position sensor comprises a light sensor operable to detect illumination by the lamp.

5. The system of claim 4 wherein the light sensor comprises a phototransistor tuned to detect a predetermined light frequency.

6. The system of claim 5 wherein the predetermined light frequency comprises infrared light.

7. The system of claim 1 wherein the lens cap position sensor comprises a temperature sensor operable to detect temperature increases associated with illumination of the lamp on the lens cap.

8. The system of claim 1 wherein the lens housing comprises a conductive portion and the lens cap position sensor comprises first and second electrical contacts aligned to complete a circuit through the conductive portion if the lens cap is inserted over the lens housing.

9. The system of claim 1 further comprising a timer associated with the illumination controller, the timer providing a predetermined delay, the illumination controller reducing illumination after the predetermined delay.

10. A method for control of projector illumination, the method comprising:
    illuminating light from a projector lamp through a lens;
    covering the lens with a lens cap to block the light;
    sensing an electrical circuit completed by contact of the lens cap to lens housing to detect the covering of the lens with the lens cap; and
    reducing the light illuminating from the projector lamp to protect the lens cap from failure.

11. The method of claim 10 further comprising:
    removing the lens cap from covering the lens;
    sensing the removing of the lens cap;
    resuming the illuminating of light from the projector lamp.

12. The method of claim 10 wherein sensing an electrical circuit completed by contact of the lens can to the lens housing to detect the covering of the lens further comprises:
    interfacing electrical contacts associated with the lens cap and a conductive portion associated with the lens housing of the projector; and
    sensing completion of a circuit between the contacts and the conductive portion.

13. The method of claim 10 wherein reducing the illuminating further comprises turning off the projector lamp.

14. The method of claim 10 reducing the illuminating further comprises illuminating a dark image.

15. A method for sensing the covering of a lens by a lens cap, the method comprising:
    aligning a light sensor on the lens cap to have illumination from the lens if the lens cap is inserted over the lens;
    sensing a predetermined illumination of light illuminated from the lens with the light sensor; and
    communicating the sensing of the illumination to an illumination source to reduce the illumination.

16. The method of claim 15 wherein the light sensor comprises a phototransistor tuned to detect light of a predetermined intensity.

17. An information handling system comprising:
    a housing;
    components disposed in the housing and operable to process information for display;
    a lamp disposed in the housing and operable to illuminate one or more of the components for display of the information;
    a lens housing coupled to the housing and aligned to project light illuminated from the lens in a predetermined direction:
    a lens supported by the lens housing, aligned with the lamp and operable to focus the illumination for presentation of the information;
    a lens cap operable to cover the lens housing to block the illumination from the lens;
    a lens cap position sensor coupled to the lens cap and operable to detect that the lens cap is positioned to block the illumination; and
    an illumination controller interfaced with the lens cap position sensor through the lens housing and operable to reduce illumination if the lens cap position sensor detects that the lens cap is positioned to block the illumination.

18. The information handling system of claim 17 wherein the illumination controller comprises firmware operable to turn off the lamp.

19. A system for controlling a projector lamp illumination of light through a lens based on a lens cap position relative to the lens, the system comprising:
    a lens housing holding the lens in position to illuminate light from the projector lamp;
    a lens cap coupler operable to hold the lens cap over the lens housing to block light illuminating from the lens;
    a lens cap position sensor operable to detect if the lens cap is positioned over the lens housing to block light illuminating from the lens; and
    an illumination controller in communication with the lens cap position sensor, the illumination controller operable to illuminate a dark image from the lamp if the lens cap position sensor detects that the lens cap is positioned over the lens housing.

20. A system for controlling a projector lamp illumination of light through a lens based on a lens cap position relative to the lens, the system comprising:
- a lens housing holding the lens in position to illuminate light from the projector lamp, the lens housing having a conductive portion;
- a lens cap coupler operable to hold the lens cap over the lens housing to block light illuminating from the lens;
- a lens cap position sensor having first and second electrical conductors, the lens cap position senor operable to detect if the lens cap is positioned over the lens housing to block light illuminating from the lens by detecting a circuit completed between the first and second electrical conductors through the lens housing conductive portion; and
- an illumination controller in communication with the lens cap position sensor, the illumination controller operable to reduce illumination from the lamp if the lens cap position sensor detects that the lens cap is positioned over the lens housing.

21. A system for controlling a projector lamp illumination of light through a lens based on a lens cap position relative to the lens, the system comprising:
- a lens housing holding the lens in position to illuminate light from the projector lamp;
- a lens cap coupler operable to hold the lens cap over the lens housing to block light illuminating from the lens;
- a lens cap position sensor operable to detect if the lens cap is positioned over the lens housing to block light illuminating from the lens;
- an illumination controller in communication with the lens cap position sensor, the illumination controller operable to reduce illumination from the lamp if the lens cap position sensor detects that the lens cap is positioned over the lens housing; and
- a timer associated with the illumination controller, the timer providing a predetermined delay, the illumination controller reducing illumination after the predetermined delay.

* * * * *